No. 620,438. Patented Feb. 28, 1899.
G. S. FOUTS.
CABLE GRIP.
(Application filed Apr. 18, 1898.)
(No Model.) 2 Sheets—Sheet 1.

Witnesses.

Inventor.
George S. Fouts
by Spear Seely
Attorneys

No. 620,438.

G. S. FOUTS.
CABLE GRIP.
(Application filed Apr. 18, 1898.)

Patented Feb. 28, 1899.

(No Model.)

2 Sheets—Sheet 2.

Witnesses.

Inventor.
George S. Fouts
by Spear Seely
Attorney

UNITED STATES PATENT OFFICE.

GEORGE S. FOUTS, OF SAN FRANCISCO, CALIFORNIA.

CABLE-GRIP.

SPECIFICATION forming part of Letters Patent No. 620,438, dated February 28, 1899.

Application filed April 18, 1898. Serial No. 678,002. (No model.)

*To all whom it may concern:*

Be it known that I, GEORGE S. FOUTS, a citizen of the United States, residing at San Francisco, in the county of San Francisco and State of California, have invented certain new and useful Improvements in Cable-Grips, of which the following is a specification.

My invention relates to grips adapted to be used in connection with traveling cables in order to furnish means for attaching whatever structure or thing is to be drawn by such cable.

In order to fully illustrate my invention, I have in this application described and shown it embodied in a grip used for hauling logs in lumbering operations.

Figure 1:
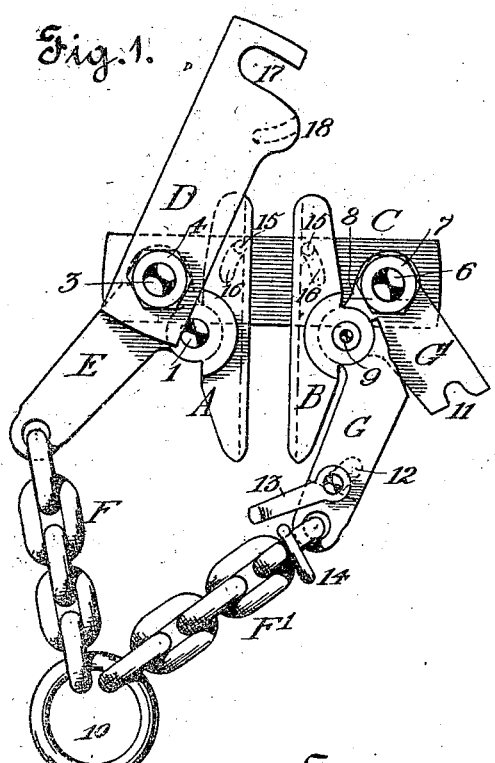
Figure 2:
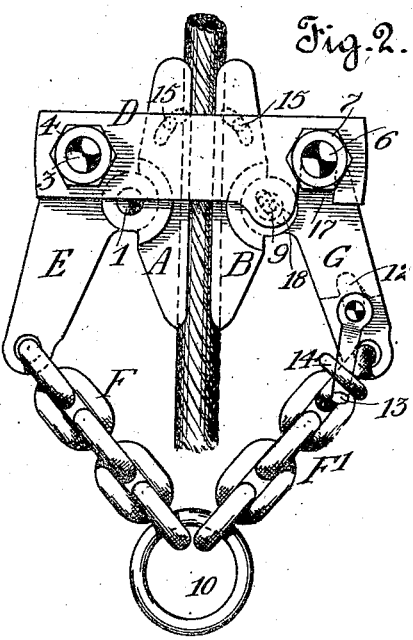
Figure 6:
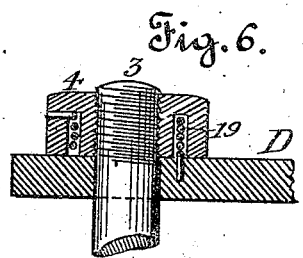
Figure 3:
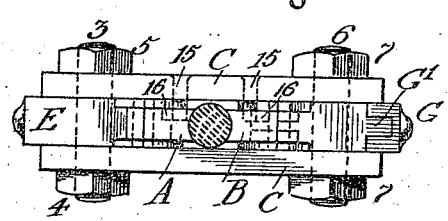
Figure 5:
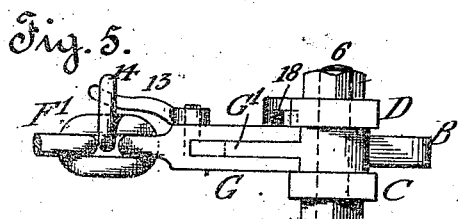
Figure 4:
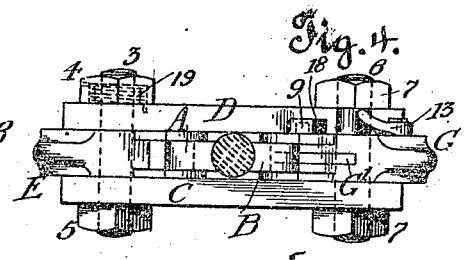
Figure 7:
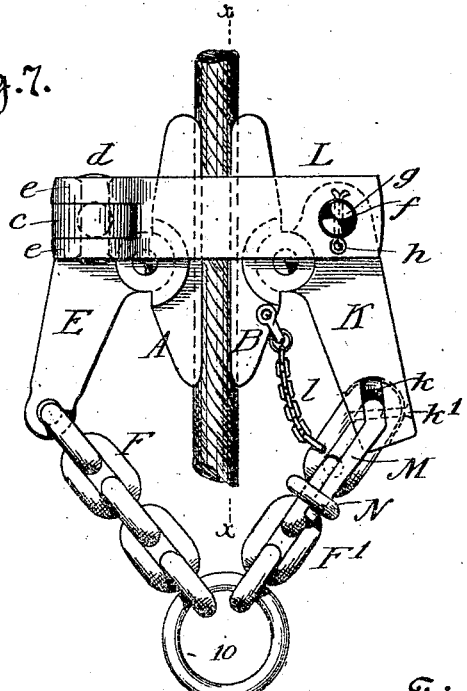
Figure 8:
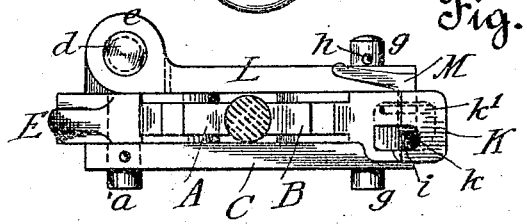
Figure 10:
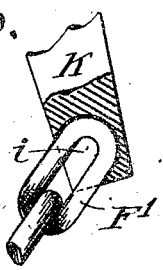
Figure 9:
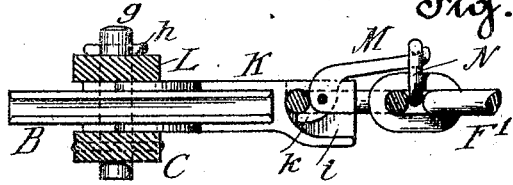

In the accompanying drawings, Figure 1 is a plan of the grip open. Fig. 2 is a similar view of it closed. Fig. 3 is a rear elevation. Fig. 4 is a front view with the chains removed. Fig. 5 is a side elevation. Fig. 6 is a detail section of a nut and spring used in connection with the locking-bar shown as open in Fig. 1. Fig. 7 is a plan view of a modification. Fig. 8 is a front elevation of the same. Fig. 9 is a section on line $x$ $x$ of Fig. 7. Fig. 10 is a detail section of the recessed lever which operates one of the gripping-jaws.

The gripping-jaws A and B are mounted between two plates C and D, the former of which is the supporting plate or base of the structure, while the latter is the locking-bar pivoted so as to be movable independently of the plate C. The jaws have curved bearing edges to fit and grip the cable and are arranged parallel to each other. They are of such length as to give a long firm bearing upon the cable and when moved, as in separating or clamping them, retain their parallel position. The jaw A is pivoted upon a pin 1 by means of ears offset from such jaw. A lever E is pivoted upon a pin 3, which passes through the plates C and D and has threaded ends to receive the nuts 4 and 5. An offset 2 of the lever E is also pivoted upon the pin 1. A short chain F is connected to the free end of the lever E. The jaw B is also mounted between the plates C and D, but is operated by a two-part lever-arm G G'. The part G' is pivoted upon a pin 6, similar to the pin 3, and which connects the opposite ends of plates C and D and is secured by nuts 7. The arm G' is provided with an offset 8, through which a pin 9 passes. The part G of the lever is pivoted upon this pin 9, and to its free end is attached the short chain F'. The jaw B is pivoted upon pin 9 and is moved toward or from the jaw A by the movement of the arm G', whose offset 8 acts as a crank from the center of motion, which is the pin 6. The two chains F F' are joined to a ring 10, to which the hauling-chain or other means for attaching the log is connected.

By reference to Fig. 1, which shows the grip open, it will be seen that the arms G G' are adapted to be locked together and to respond as one arm to the strain on the hauling-chains. The arm G is forked, Fig. 5, to receive the arm G', and the end of the latter has a locking-recess 11. A dog or stud 12 is pivoted in the arm G, which is adapted to enter the recess 11 and lock the two arms in line, Fig. 2. This stud is operated by a handle 13, which projects forward of the arm G and is adapted to be locked rigidly by a link 14, engaged with one of the links of the chain F', Figs. 2 and 5. In this locked position the strain on the chains is transmitted equally to the jaws A and B—to the former directly through the lever-arm E and to the latter through the arm G and thence to the arm G', locked to it. The effect of th strain is therefore to clamp the jaws firmly upon the cable, the clamping action being increased if the strain increases.

The grips are guided in their movements toward and away from each other by guide-pins 15, secured to the base-plate C and which enter curved guide-slots 16 in the respective grips and are also held in proper position by the locking-bar D. This bar, as before stated, is movable, being pivoted upon the pin 3. It is provided at its free end with a recess 17 to engage the pin 6, Fig. 2, and with a slot 18, which takes over the end of the pin 9 in the arm G'. Thus the parts are all securely locked together until by knocking the link 14 off the end of the handle 13 the strain pulls the arm G to the position of Fig. 1 and throws out the arm G' and jaw B by the pull upon the crank or offset 8. The pin 9 can then be disengaged from the slot 18. I prefer to provide the locking-bar with a spring which will positively throw it out of engagement, as shown in Fig. 1, and for this purpose have devised the construction shown in detail in Fig. 6 and in dotted lines in Fig. 4. A channel is formed in the nut 4, which receives a coil-spring 19, one end of which is fixed in the nut and the other in the locking-bar. This spring is under tension when in the position of Fig. 6 and tends constantly to open the locking-bar, which it is permitted to do when that bar is released by the disengagement of the other locking devices described. In released position (that of Fig. 1) the device is adapted to be engaged with the cable in any position, according to the circumstances attending its use.

In Figs. 7 to 10, inclusive, I have shown a modified structure, which is in some respects simpler, but in which the method of operation is the same. In this case instead of employing a two-part arm G G' to operate one of the jaws I use a single arm K, connected to the jaw B in the same manner as the arm E, before described, and in which no change is made. The base-plate C is also as before described; but I have modified the construction of the locking-bar. Instead of a threaded pin 1 I use the smooth pin $a$, which acts as a pivot for the arm E. The locking-bar L has in this case a vertical movement and is journaled by means of a transverse pin $d$, which passes through two ears $e\ e$ on the locking-bar and a lug $c$, formed upon the arm E. The free end of the locking-bar has a hole $f$, which engages with the pin $g$, which is the pivot for the lever-arm K. A cotter $h$ holds the locking-bar in place.

A recess $i$ is formed in the free end of arm K, which receives the first link of the chain F'. The link is held in place by a dog $k$, which is an extension of the handle M and is pivoted upon a transverse pin $k'$ in the recess. The handle is locked in the manner before described by a link N, which engages with the main chain, Figs. 7 and 9. The hauling strain is in this case transmitted directly to the grip through the single arm K, since the grip is pivoted to an offset from that arm; but the releasing of the grip is in this case effected by the hauling strain acting directly upon the grip when the link N has been knocked off the end of the handle M. A light chain $l$ is secured to the first link of chain F" and to the grip B, which is normally slack; but when the locking-link is released the strain on the dog $k$ is unopposed, the handle is thrown back, and the chain F" pulled out of its recess. This tightens the small chain $l$, puts a pulling strain on the grip, which acts on the crank or offset of the arm K in a direction opposite to the normal strain upon it, throws such arm outward, and of course releases the grip B and the cable.

The device just described differs from the one first described principally in that the unlocking of the jaws is not entirely automatic, since the cotter-pin, which holds the locking-bar, must be positively removed; but in their essential operation as gripping devices the two devices are similar. The strain in hauling logs, for instance, is somewhat at an angle to the course of the cable. The normal strain when the releasable lever is locked to its chain is always transmitted first to the lever and then to its crank-arm, which tends to close the jaw. The unlocking of the chain and lever necessarily transfers the strain from the lever to its crank-arm—in one case through the lever-arm G, which becomes an independent connection to the crank-arm, and in the other through the chain $l$, which is an equivalent independent connection. In both cases it is a transfer of the strain from the long arm of a lever to its short arm, changing a closing effect to an opening effect and doing it automatically.

Having thus fully described my invention, what I claim as new, and desire to secure by Letters Patent, is—

1. In a cable-grip, a lever having two arms, a jaw connected to one arm, a hauling attachment connected to the other arm and transmitting a normal closing strain, and means for shifting the strain to the arm which is connected to the jaw, whereby it becomes an opening strain.

2. In a cable-grip, a gripping-jaw mounted on the short arm of a bent lever pivoted at the angle, a chain connected to the long arm for transmitting a hauling strain thereto and closing the jaw, means for locking the said lever and chain together to maintain said closing strain; an independent connection from said chain to the short arm, normally inactive, but adapted on the release of said locking means, to transmit the strain to said arm and thereby open the jaw.

3. In a cable-grip and in combination, a pair of gripping-jaws, pivoted levers connected to said jaws and to a hauling attachment, means for locking one of said levers to the hauling attachment, and an independent connection from the hauling attachment to one of said jaws; whereby, on the release of said locking means, the hauling strain will automatically open the jaws.

4. In a cable-grip and in combination, a pair of gripping-jaws, a pivoted lever having a crank-arm, connected to each jaw, a chain connecting the free end of each lever to a hauling attachment, and means for locking one of said levers to its chain; whereby on the release of said locking means the hauling strain will automatically open said jaws.

5. In a cable-grip and in combination, a supporting-plate a lever pivoted at each end of said plate, and having a crank-arm or offset carrying a pivoted gripping-jaw; chains extending from said jaws and united to form a single hauling device, means for locking one of said chains to its lever, whereby the hauling strain is transmitted first to said lever, and then to its crank-arm to keep the grip closed; and means for releasing said lock, whereby the hauling strain is transferred and brought first upon the crank-arm in order to open the grip.

6. In a cable-grip, the combination with a pivoted gripping-jaw, of an operating-lever having a crank-arm to which such jaw is pivoted; a chain connected to said lever and locked to it, so as to transmit a hauling strain through said lever to close the jaw; and an independent connection from said chain to the crank-arm, whereby upon the unlocking of said chain and lever, the strain is transferred through said connection to the crank-arm.

7. In a cable-grip, the combination with a pivoted gripping-jaw, of an operating-lever which carries said jaw, a chain connected to said lever, a dog pivoted in said lever, and a locking-link for securing the free end of said dog to the chain.

8. In a cable-grip and in combination, a supporting-plate an angular lever pivoted thereon and carrying a gripping-jaw, a second angular lever pivoted thereon, and to a second gripping-jaw, an arm independently pivoted to said second jaw and provided with means for locking it to said second angular lever, hauling attachments whereby a closing strain is normally transmitted to said jaws, and means for releasing the lock between the said arm and second lever, whereby the hauling strain becomes an opening strain.

9. In a cable-grip, the combination with a jaw adapted to coöperate with another jaw in gripping a cable, of a two-part lever G, and G', independently pivoted to said jaw, means for locking said parts together, whereby they operate as one lever in closing the jaws, and means for unlocking said arm and lever whereby the part G' becomes ineffective, and the part G operates independently to open said jaw.

10. In a cable-grip and in combination, a base-plate, a lever pivoted thereon, a jaw pivoted to the end of said lever upon an extended pin, means for operating said lever for opening and closing said jaw, and a locking-bar pivoted upon the base-plate and having two slots, one to engage the pivot of said lever and the other to engage the pivot of said jaw.

11. In a cable-grip and in combination, a supporting-plate, operating-levers pivoted thereto and carrying gripping-jaws, means for opening and closing said jaws, a bar pivoted to the said base-plate and having means whereby it may be locked in position parallel to said base-plate, means for disengaging said bar from the gripping devices, and a spring for throwing the same out of its said parallel position.

12. In a cable-grip, the combination with a locking-bar D, of a pin 3 upon which said bar is pivoted, a channeled nut 4, and a spring 19 held within said channel and engaged at one end of the locking-bar and at the other to the said nut, substantially as and for the purpose set forth.

13. In a cable-grip and in combination, a supporting-plate, a two-part lever consisting of a part G' pivoted to the supporting-plate and having a locking-recess, and of a part G carrying a dog adapted to engage said recess, a hauling-chain connected to the free end of said part G, a link for locking said dog to the hauling-chain, and of gripping-jaws independently engaged to said parts G', and G.

In testimony whereof I have affixed my signature, in presence of two witnesses, this 4th day of April, 1898.

GEORGE S. FOUTS.

Witnesses:
L. W. SEELEY,
M. J. DIETZ.